(12) United States Patent
Deas et al.

(10) Patent No.: US 7,346,549 B2
(45) Date of Patent: Mar. 18, 2008

(54) SYSTEM AND METHOD FOR WIRELESSLY TRANSACTING ACCESS TO A SET OF EVENTS AND ASSOCIATED DIGITAL CONTENT/PRODUCTS

(75) Inventors: David A. Deas, Round Rock, TX (US); Lalitha Suryanarayana, Austin, TX (US); Bruce Edward Stuckman, Austin, TX (US); David Randall Wolter, Austin, TX (US); Rias Muhamed, Austin, TX (US); Russell William White, Austin, TX (US); Michael Grannan, Austin, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 964 days.

(21) Appl. No.: 10/180,516

(22) Filed: Jun. 27, 2002

(65) Prior Publication Data

US 2004/0002904 A1   Jan. 1, 2004

(51) Int. Cl.
*G06Q 30/00*   (2006.01)
(52) U.S. Cl. ...................................................... 705/26
(58) Field of Classification Search ................. 705/26, 705/27
See application file for complete search history.

(56) References Cited

U.S. PATENT DOCUMENTS

| | | | | |
|---|---|---|---|---|
| 5,572,442 | A | 11/1996 | Schulhof et al. | 364/514 C |
| 5,915,093 | A * | 6/1999 | Berlin et al. | 709/219 |
| 6,816,778 | B2 * | 11/2004 | Diaz | 701/200 |
| 2001/0013120 | A1 | 8/2001 | Tsukamoto | 725/5 |
| 2001/0037360 | A1 | 11/2001 | Ekkel | 709/203 |
| 2001/0039662 | A1 | 11/2001 | Sibley | 725/136 |
| 2001/0044747 | A1 | 11/2001 | Ramachandran et al. | 705/16 |
| 2002/0035726 | A1 * | 3/2002 | Corl | 725/39 |
| 2002/0042729 | A1 * | 4/2002 | Yajima et al. | 705/5 |

(Continued)

FOREIGN PATENT DOCUMENTS

EP   881587   2/1998

(Continued)

OTHER PUBLICATIONS

Bonello, Deborah "Xmas shopping using phone technolog.", Campaign, Dec. 15, 2000, p. 14. Retrieved from Dialog File: 16, ACC#: 08194742.*

*Primary Examiner*—Naeem Haq
(74) *Attorney, Agent, or Firm*—IP Authority, LLC; Ramraj Soundararajan

(57) ABSTRACT

One or more content providers push data related to: movies, movie products, digital movie content over a network (e.g., a LAN, a WAN, the Internet, or a wireless network) onto an information filling station which, in turn, wirelessly transacts (over a network based on the 802.11b protocol) and transmits any requested data to a portable computer-based device (e.g., laptop, a pen-based computer device, a PDA, a wireless phone, or a pager). The portable device performs financial transactions for: purchasing movie tickets (directly or via auctions), downloading digital entertainment content of interest (e.g., copy of a movie of interest, copy of a movie identified based on a pre-stored profile, copy of soundtrack of a movie of interest), or movie related products. Any purchased digital content is either transferred wirelessly onto the portable device or, optionally, sent on a storage medium to a physical address associated with the profile.

30 Claims, 7 Drawing Sheets

U.S. PATENT DOCUMENTS

2002/0052781 A1    5/2002   Aufricht et al. ............... 705/14
2002/0073057 A1    6/2002   Benoit et al. .................. 707/1
2002/0184302 A1*  12/2002   Prueitt et al. ............... 709/203

FOREIGN PATENT DOCUMENTS

| | | |
|---|---|---|
| EP | 1041502 | 4/2000 |
| WO | WO 00/65514 | 11/2000 |
| WO | WO 0065514 | * 11/2000 |
| WO | WO 01/95267 | 12/2001 |

\* cited by examiner

SYSTEM AND METHOD FOR WIRELESSLY TRANSACTING ACCESS TO A SET OF EVENTS AND ASSOCIATED DIGITAL CONTENT/PRODUCTS

BACKGROUND OF THE INVENTION

1. Field of Invention

The present invention is generally related to digital content providers. More specifically, the present invention is related to wireless access of event related information and content via a portable device.

2. Discussion of Prior Art

Websites such as Fandango.com™ and MovieTickets.com™ allow users to view movie trailers, movie reviews, and movie schedules. Users are also able to purchase tickets online at these websites, wherein the purchased tickets can be picked up at the box office prior to the movie by using a form of ID (such as the credit card that was used to make the reservation) or a transaction confirmation number.

FIG. 1 illustrates a general prior art method 100 associated with purchasing movie tickets at a location other than the movie theater. The two common scenarios associated with such prior art methods include allowing users to purchase tickets either over the Internet or over a telephone. In the first scenario, users access a website (such as Fandango.com or MovieTickets.com) 102 over a network (such as the Internet) to request movie related information. In the second scenario, users access a communication center over a telephone and access movie related information 104. Steps 106 through 112 of FIG. 1 illustrate steps common to both scenarios.

In step 106, users identify a theater of interest, a movie of interest playing in the theater of interest, and a convenient showtime for the movie of interest. Next, in step 108, users select a method of payment (usually a charge card) and perform a financial transaction for purchasing tickets for the movie of interest. Upon successful completion of the financial transaction, a confirmation number and instructions regarding how and where to collect the tickets are provided to the user.

In one instance, users are instructed to collect the tickets at a kiosk located at the movie theater of interest. Upon arrival at the kiosk, the user is either instructed to insert the charge card 108 that was used to make the financial transaction for purchasing the tickets or is instructed to enter the confirmation number. Upon authentication, the kiosk prints out the tickets for the movie of interest 110, which are then collected by the user.

Although the above-mentioned first scenario is convenient for ordering movie tickets, it requires users to have access to a computer that is capable of being connected to a network such as the Internet (via a network interface device communicating with a hub/router or a modem). The second scenario, on the other hand, restricts users to use an aural interface implemented in conjunction with a telephone.

One of the problems associated with the first scenario is the necessity of a router/hub or a telephone line to be physically nearby, so that a physical connection can be made. One alternative in prior art communication systems has been to use wireless network devices (such as a wireless network interface card) that can access the router/hub without a physical connection.

One popular method of implementing a wireless connection is based upon the IEEE 802.11 standard. 802.11 refers to a family of specifications developed by the Institute of Electrical and Electronics Engineers (IEEE) for wireless local area network (LAN) technology. 802.11 specifies an over-the-air interface between a wireless client and a base station or between two wireless clients. There are several specifications in the 802.11 family, some of which are described below:

- 802.11—applies to wireless LANs providing 1 or 2 Mbps transmission in the 2.4 GHz band using either frequency hopping spread spectrum (FHSS) or direct sequence spread spectrum (DSSS).
- 802.11a—an extension to 802.11 that applies to wireless local area networks (LANs) and provides up to 54 Mbps in the 5 GHz band. 802.11a uses an orthogonal frequency division multiplexing encoding scheme rather than FHSS or DSSS.
- 802.11b—This is also referred to as 802.11 High rate or Wi-Fi (for wireless fidelity) and was formed as a ratification to the original 802.11 standard, allowing wireless functionality comparable to the Ethernet. This is an extension to 802.11 that applies to wireless LANs and provides 11 Mbps transmission (with fallback to 5.5, 2, and 1 Mbps) in the 2.4 GHz band. Transmission in the 802.11b standard is accomplished via DSSS.
- 802.11 g—applies to wireless LANs and provides 20+ Mbps in the 2.4 GHz band.

The most popular of the above standards is the 802.11b. One problem associated with this standard is that the signal strength fades away as a function of distance and, as a result, the data rate falls back to 5.5, 2, or 1 Mbps, depending on the distance from the Wi-Fi router/hub and the strength of the signal.

Returning to the discussion of FIG. 1, a computer equipped with a wireless network interface card can be conveniently used to order movie tickets, but the computer has to operate within a certain radius for it to be functional. Thus, if one were outside their residence or outside the optimal radius, they would have to use a telephone, as described in the second scenario, to order the movie tickets. But, as mentioned earlier, this is a pure aural interface which lacks the ease of a visual interface. Furthermore, prior art systems implementing functionality similar to that of FIG. 1 do not offer content that can be directly downloaded wirelessly onto a portable device not operatively linked to the Internet.

The following references provide for a general description of digital content providers that allows digital content to be downloaded. But, none of the references disclose a portable device that allows for the purchase of event tickets and associated digital content (e.g., related to a movie of interest) based upon wireless interaction.

The U.S. patent to Schulhof et al. (U.S. Pat. No. 5,572,442), assigned to Information Highway Media Corporation, provides a system for distributing subscription and on-demand audio programming. Disclosed is a system for downloading digital audio data onto a portable audio storage medium and listening to it at a desired time. The portable audio storage medium is capable of high-speed data transfer that can be downloaded from such systems as a television cable system, satellite, or fiber optic telephone link.

The published U.S. patent application to Tsukamoto (2001/0,013,120A1), assigned to NEC Corporation, provides for a digital contents rental system. Disclosed is a process that consists of a customer visiting the store with a portable storage unit, such as a magnetic disk. The user may then choose from a plurality of digital content and download desired content onto his/her storage medium.

The published U.S. patent application to Ekkel (2001/0,037,360A1), assigned to Koninklijke Philips Electronics N.V., provides for a data service at a transit terminal. Disclosed is a system that provides information content to a user at a repository. While a consumer is traveling, a data service offers information availability that can be downloaded by the user to a storage device and viewed offline. Using a mobile storage medium, such as a memory card or a magnetic disk, the individual may use the highly customizable service to download electronic information content from a host repository or server.

The published U.S. patent application to Sibley (2001/0,039,662A1), assigned to Hughes Electronics Corporation, provides for a digital over-the-air communication system for use with digital terrestrial broadcasting system. Disclosed is a system for distributing electrical content using digital over-the-air communication. The process consists of a network operation center uplinking electronic content packages to a satellite, a broadcast center receiving the electronic content from the satellite, and a user device receiving the digital content via a digital channel generated by the broadcast center.

The published U.S. patent application to Ramachandran et al. (2001/0,044,747A1), assigned to Diebold, Incorporated, provides a system and method dispensing digital information from an automated transaction machine. Disclosed is a service that offers digital content information to a user through an automated transaction machine.

It should be noted that there appears to be no teaching in these references for using a portable device to perform transactions related to event tickets (directly or based upon an auction) or to purchase digital content related to the event based upon advertisements or a pre-stored profile. Thus, whatever the precise merits, features, and advantages of the above-cited references, none of them achieve or fulfills the benefits of the present invention.

SUMMARY OF THE INVENTION

The system and method of the present invention provides for an architecture comprising an information filling station (IFS) and a portable device interacting with the IFS over a wireless network. One or more content providers are able to push data content related to events (such as movies) over a network onto the IFS which, in turn, transmits any requested event related content to the portable computer-based device. Furthermore, the portable device is able to wirelessly interact with the IFS to perform financial transactions for purchasing tickets (direct purchase tickets or via auction-based ticket purchase), digital entertainment content of interest, and event related products.

In the preferred embodiment, the IFS is placed at or near a theater, theater lobby or ticket stand. Alternatively, many of the functions described herein can also be implemented in a hub at a location remote from a theater such as a generic information filling station. In one embodiment, the wireless communication between the IFS and the portable device is implemented based on an 802.11b communication protocol.

The portable device can be any of, but not limited to, the following: a laptop, a pen-based computer, a personal digital assistant (PDA), a wireless phone capable of displaying digital entertainment content, or a pager capable of displaying digital entertainment content. The data content can be any of, but not limited to, the following: trailers, reviews (text, audio, and video), showtimes, ticket availability, prices, director's comments, text of dialogue, auction information related to tickets for movies of interest, pushed advertisements, movie related products, digital movie content, movie soundtrack, food/snack information, feedback information, or chatroom related information.

DESCRIPTION OF THE PREFERRED EMBODIMENTS

Figure 1:
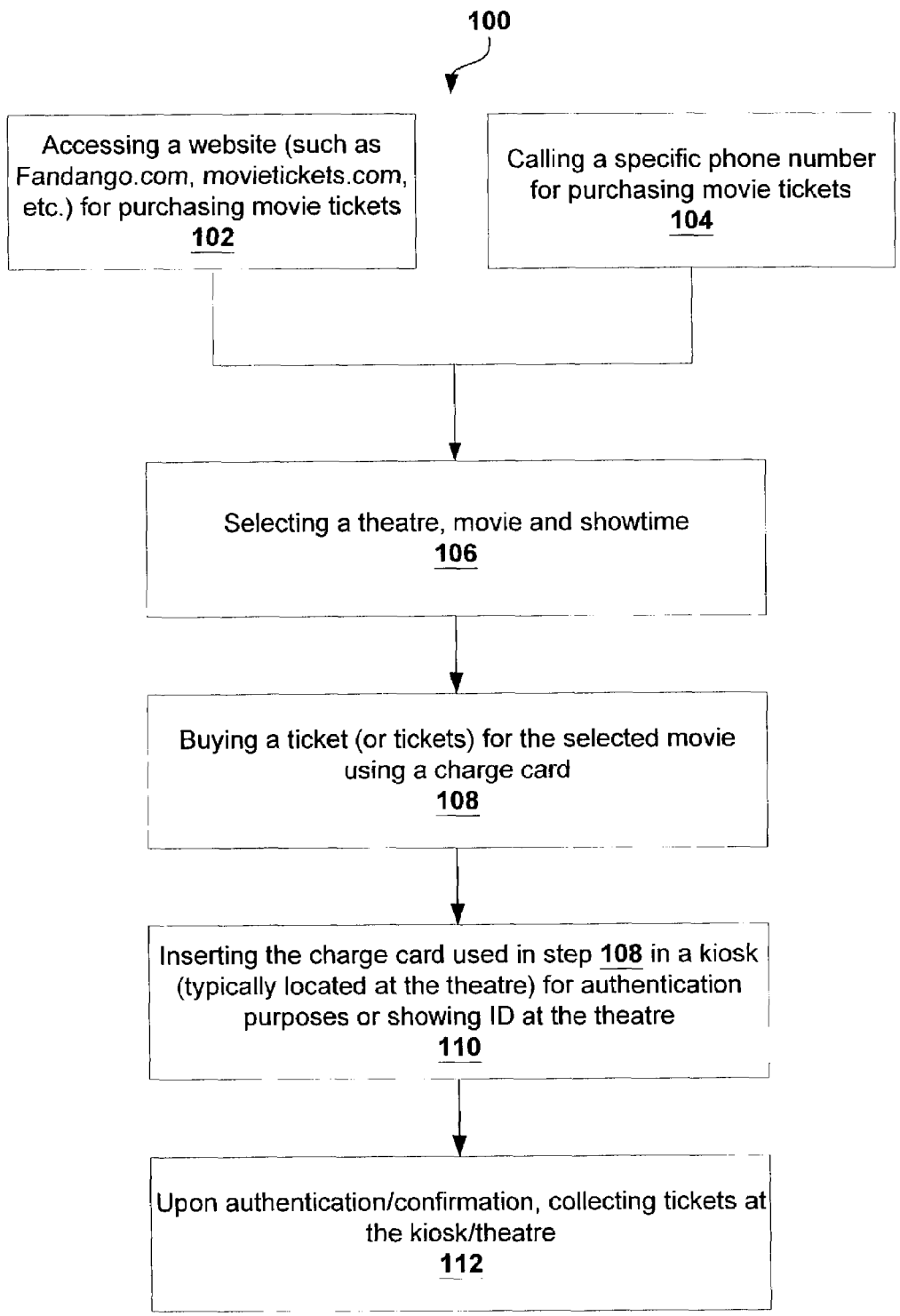
FIG. 1 illustrates a general prior art method associated with purchasing movie tickets at a location other than the movie theater.

While this invention is illustrated and described in a preferred embodiment, the invention may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that for the purposes of description of the preferred embodiment, specific examples of venues and events (i.e., theaters for venues and movies for events) are used, but one skilled in the art can extend this to encompass other venues and events without departing from the scope of the present invention.

Figure 2:
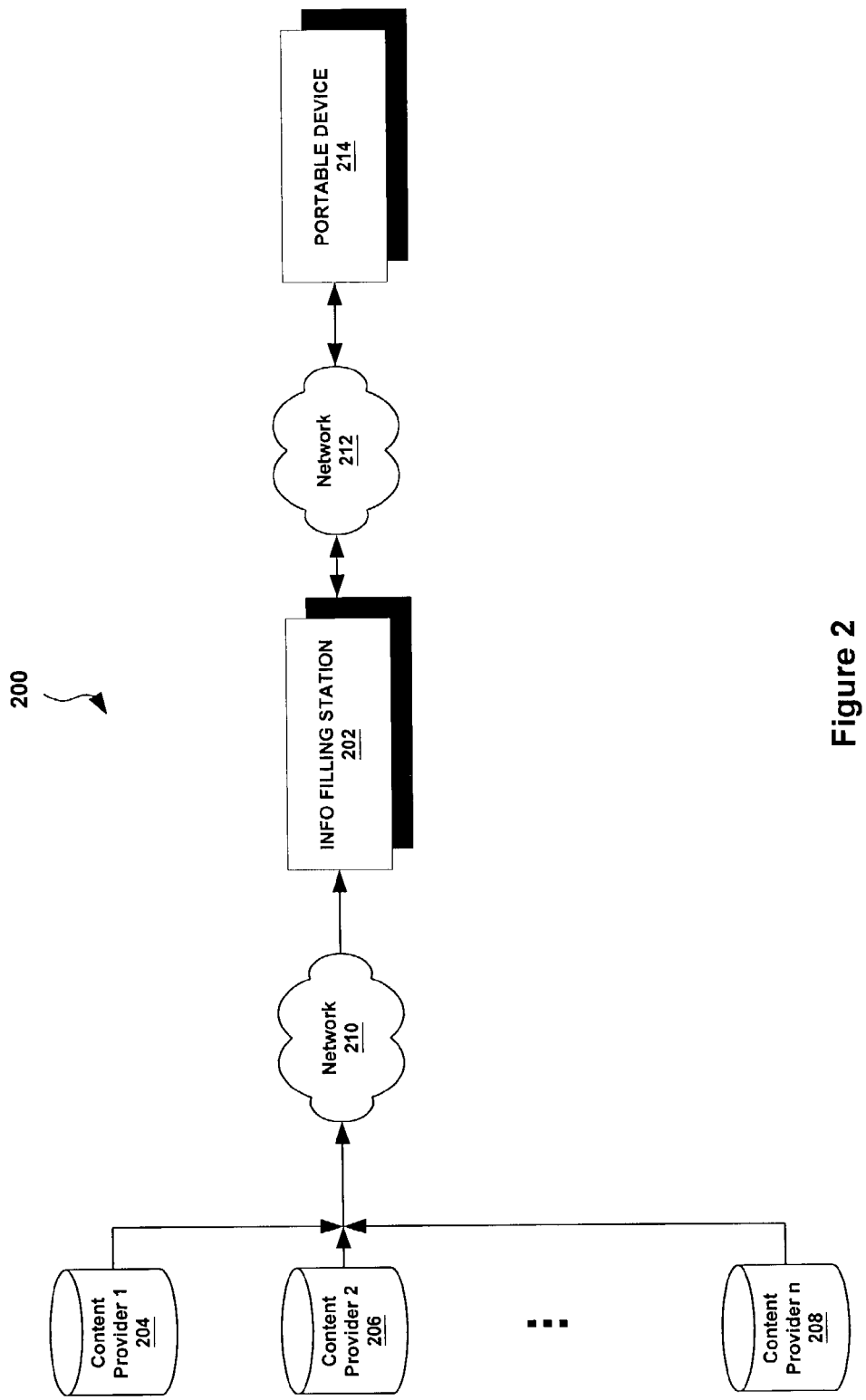
FIG. 2 illustrates a general architecture of the preferred embodiment of the system of the present invention.

FIG. 2 illustrates a general architecture of the preferred embodiment of the system of the present invention. One or more content providers 204, 206, and 208 push digital data content over network 210 to an information filling station (IFS) 202. A portable device 214 then wirelessly interacts with the IFS 202 and is able to perform financial transactions to purchase tickets, digital event related content, and event related products. Network 210 can be any of, but is not limited to: a local area network (LAN), a wide area network (WAN), a wireless network, telephony-based network, or the Internet.

More specifically, in FIG. 2, the content providers 204, 206, and 208 push event related content such as, but not limited to: event information, event information, showtimes, ticket pricing, event reviews, food/snack availability at various venues hosting such events, auction information related to event tickets, advertisements, event previews, digital event content, and digital event related content (e.g., soundtrack of a movie, text of dialog of a movie, and/or directors comments related to a movie).

The portable device is a computer-based device that is able to communicate wirelessly with the IFS 202 to request the above described event related content over a wireless network 212. In the preferred embodiment, the wireless communications are based upon the 802.11b standard.

Thus, users interested in purchasing tickets to one or more events of interest (e.g., one or more movies) use their portable computer-based device 214 and inquire the IFS 202 regarding one or more venues of interest (e.g., one or more theatres of interest) where the events of interest are scheduled to occur. The IFS 202 extracts information (e.g., including movies playing in the theaters of interest, ticket availability of movies, and/or pricing of movies) regarding requested venues of interest and wirelessly transmits such information onto the portable device 214, where it is rendered. Users are then able to select one or more events of interest and, based upon the availability of tickets, conduct financial transactions to purchase tickets for the events of interest. Furthermore, users are able to receive event related information and digital content directly onto their portable device 214, where it is stored and rendered upon request (or, optionally, the digital content is sent to a physical address). The portable device 214 can then be used at the venue to perform wireless authentication to obtain the tickets for the event of interest. It should be noted that the IFS 202 can be placed at or near a venue, venue lobby, or ticket stand. Alternatively, many of the functions described herein can be implemented in an IFS at a location remote from a venue, such as a generic information filling station.

Figure 3A:
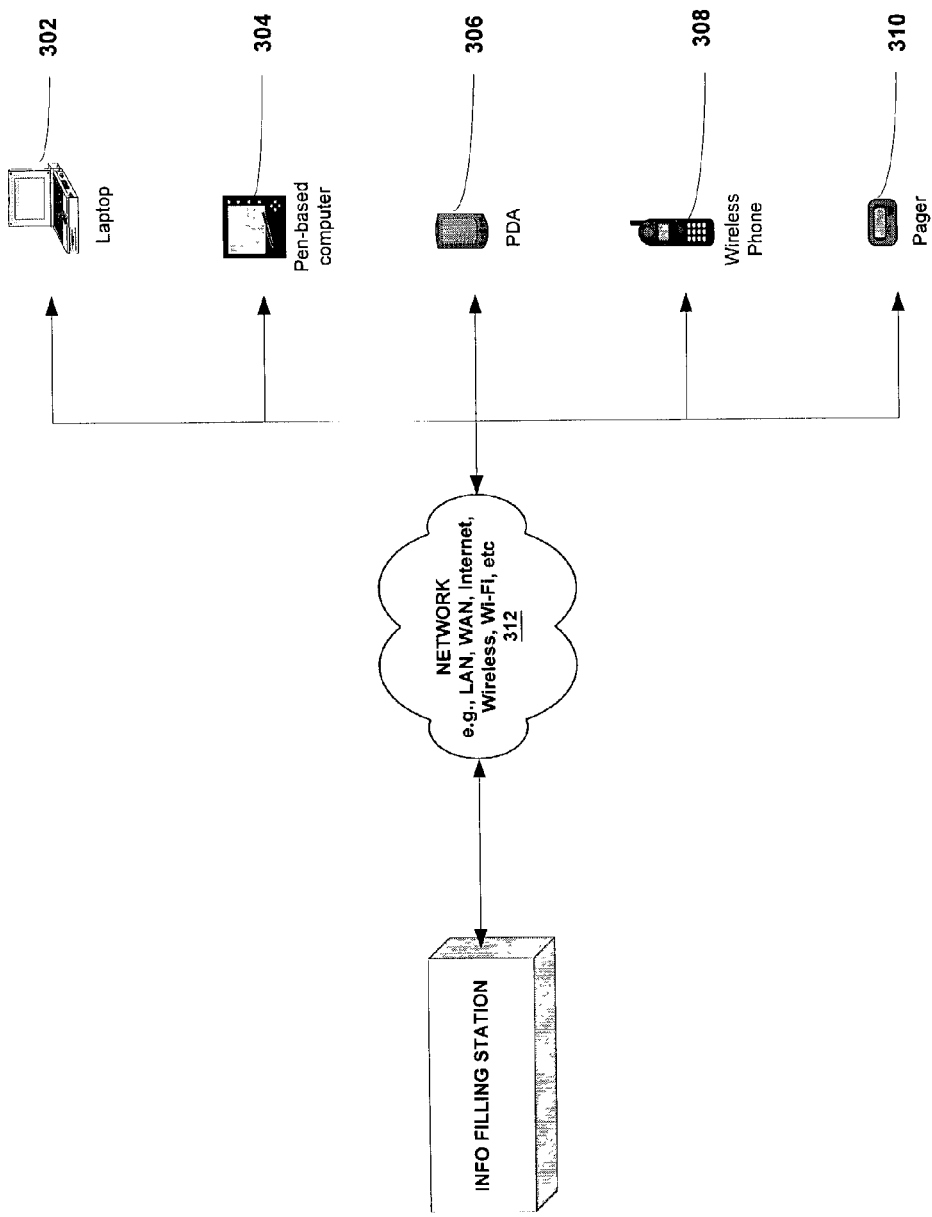
FIGS. 3a and 3b collectively illustrate the interaction between various wireless clients and the IFS core network.
Figure 3B:
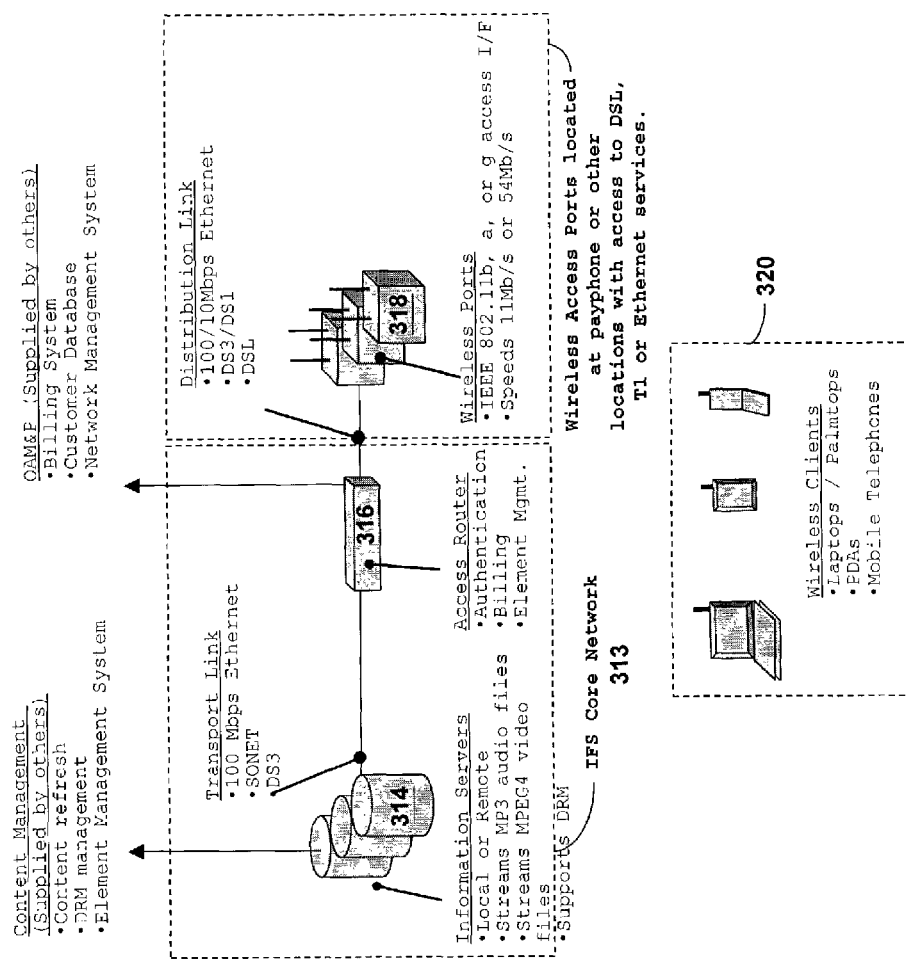

FIGS. 3a and 3b collectively illustrate the interaction between various wireless clients and the IFS core network. FIG. 3a illustrates various examples of the portable devices that can be used in conjunction with the present invention. The portable device can be any of, but not limited to: a laptop 302, a pen-based computer (e.g., a tablet PC) 304, a personal digital assistant (PDA) 306, a wireless phone 308 with a display and capable of bidirectional wireless communication, or a pager 310 with a display and capable of bidirectional wireless communication.

It should be noted that, although specific examples of portable computer-based devices are shown to best illustrate the functionality of the invention, one skilled in the art can envision other current and future portable computer-based devices that can be used without departing from the scope of the present invention. Furthermore, FIGS. 2 and 3a show, for the purposes of simplicity, one network cloud (210, 212, and 312) facilitating communication between the IFS and the content provider (210) and between the IFS and the portable computer-based devices (212 and 312). Thus, one skilled in the art can envision using more than one type of network (e.g., LAN, WAN, or the Internet) to facilitate this communication and therefore should not use this to limit the scope of the present invention.

FIG. 3b illustrates how the portable devices shown in FIG. 3a interact with the IFS core network 313. The IFS core network 313 comprises one or more information servers 314 and an access router 316 that is linked with a plurality of wireless ports 318 distributed at various physical locations. Content providers transmit various forms of data (e.g., multimedia data) to one or more information servers 314 wherein the content providers are able to refresh stored content and associate digital rights management with the stored content. The information servers 314 can either be local or be distributed across a network and are capable of storing and transmitting data such as multimedia data (e.g., mp3 audio files, video files in MPEG4 format). The access router 316 provides authentication, billing (performed via a billing system and a customer database), and element management. The access router 316 and information servers 314 are supported by separate element management systems. The IFS core network 313 is supported by the operator's existing or modified tier 2 network management system where such interfaces between the access router 316, information servers 314, and IFS core network 313 are linked through standard SNMP or CORBA complaint interfaces. As mentioned above, the access router 316 provides authentication and billing information, the content servers 314 provide element management system functions providing but not limited to content management, digital rights management and accounting, traffic statistics, and storage capabilities. The information servers 314 are linked with the access router 316 via a transportation link such as, but not limited to, an Ethernet link, a SONET link, or a DS3 link. The access router, in turn, is linked with wireless ports via a communication link such as, but not limited to, an Ethernet link, a DS3/DS1 link, or a DSL link. Furthermore, the access router 316 is linked with one or more wireless access ports located 318 at various locations (e.g., payphone or other services with access to DSL, T1, or Ethernet services). These wireless access ports 318 (e.g., IEEE 802.11a, 802.11b, or 802.11 g) provide a link between wireless clients (e.g., laptops, palmtops, PDAs, mobile telephones, etc.) 320 and the access router 316 (which in turn provides such clients with a link to data located in information servers 314).

Figure 4:
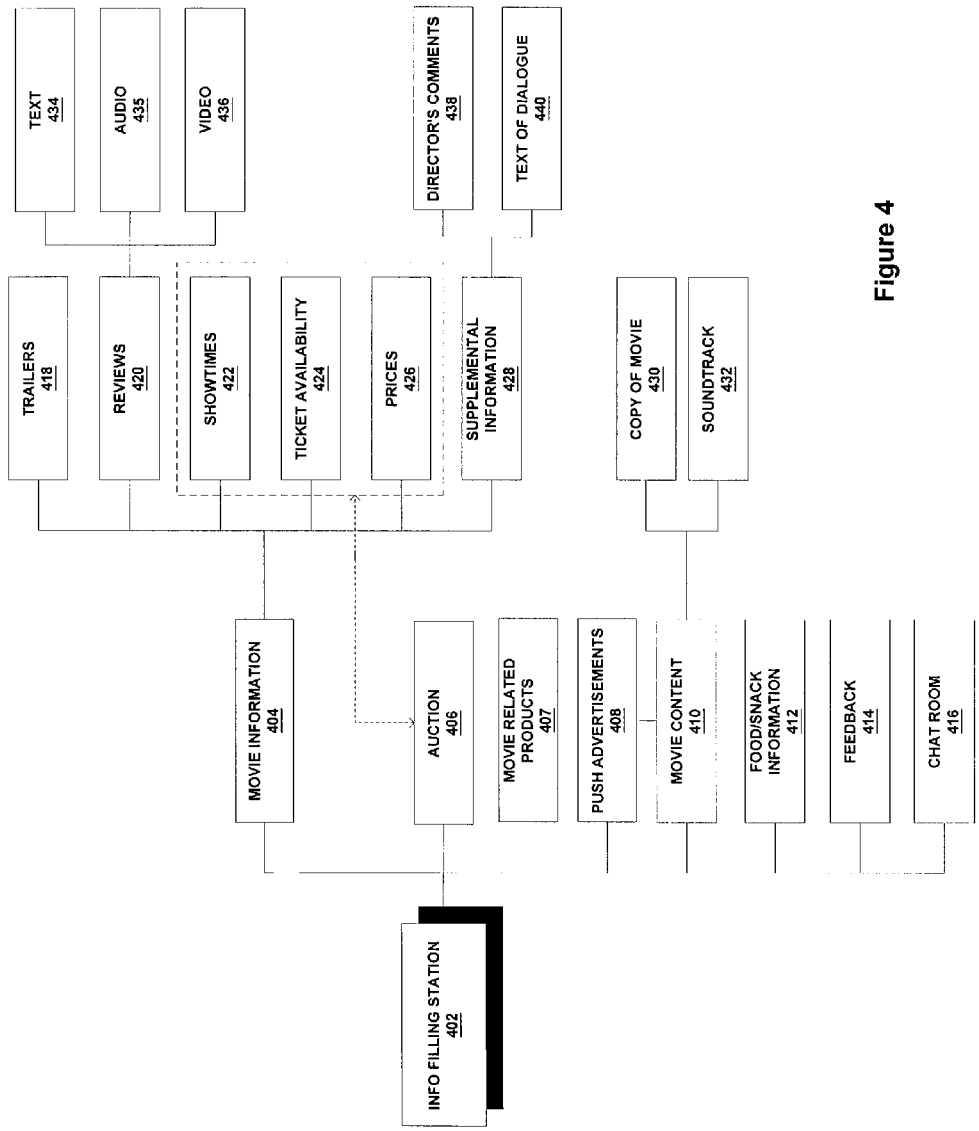
FIG. 4 illustrates a non-exhaustive group of the various interactions that are possible between a portable computer-based device and the information filling station (IFS).

FIG. 4 illustrates a non-exhaustive group of the various interactions that are possible between a portable computer-based device and the IFS 402. As mentioned earlier, event information such as movie information 404 can be accessed from the IFS 402 in a wireless manner by the portable device. In the preferred embodiment, data exchange is facilitated between the IFS 402 and a portable device via an 802.11b protocol. The various types of data that can be exchanged include, but are not limited to, movie information 404, auction related information 406, advertisements 408, digital movie content 410, food/snack information 412, feedback 414, and chatroom related information 416.

Movie related information 404 includes movie trailers 418 (in various digital formats); reviews 420 (that can be any of the following formats: text 434, audio 435, or video 436); showtimes 422, indicating various showtimes associated with movies playing at one or more theaters of interest; ticket availability information 424, indicating the availability of tickets for one or more movies of interest; price information 426, indicating price per ticket for one or more movies of interest; and supplemental information, such as, but not limited to, director's comments 438 or text of dialogue 440 associated with one or more movies of interest. Additionally, in an extended embodiment, the dialogue text 440 is presented with a rewind feature that allows users to scroll back to see text for an earlier dialogue.

Auction related information 406 can be accessed to view the availability of tickets in one or more auctions for one or more movies of interest. Alternatively, a portable device can post a previously purchased ticket for sale, transfer, or exchange via an auction. Thus, users are able to auction or reverse auction empty seats to a movie, or even inform users as to real-time price reductions based on over capacity. It should be noted that over capacity is determined in the theater ticket system separate from the IFS, wherein a notice of available seating and price is sent to the IFS. The IFS "pushes" this information much like advertisements to a user's device in close proximity of a wireless port. The device is then able to display the availability and start times associated with movies, and the user can then choose to accept or reject the theater request.

Tickets that are purchased via the IFS 402 can be printed on paper, wherein such paper tickets or pseudo tickets are sufficient to obtain or retrieve a ticket. Alternatively, users can be given a transaction identification number that can be used at a kiosk at the a theater to print valid tickets.

Advertisements 408 are used to push movie content 410 or movie related products 407 such as, but not limited to: movie soundtracks 432, a digital copy of a movie (either transferred onto a portable device or onto a tangible storage medium) 430, or other movie related products 407. Furthermore, such advertisements for movie content or movie related products can be pushed prior to, during, or after a movie. Additionally, although it is described that movie content or movie related products are pushed via advertisements, it should be noted that users are also able to order such content/products directly via their portable computer-based device.

The IFS 402 is also able to provide food/snack information 412 to users. Therefore, after purchasing their tickets, users are also able to order, via their portable device, food/snacks for pick up (or delivery to a particular location in the theater) at a theater of interest. It should be noted that such food/snack orders can be placed either before or during a movie.

Users are also able to provide feedback or access feedback related information 414 from the IFS 402. In one embodiment, a pop-up window is provided on a movie screen that provides information uploaded from the user's device, including feedback on the film, user comments, or video of the user reacting to the film. Additionally, audience response to films after a movie, during a movie, or during a scene can also be gauged. In another extended embodiment, communications such as a chatroom environment 416 with other users during a film are also provided by the IFS 402. In yet another extended embodiment, a virtual drive-in experience provided by the IFS 402 allows users to watch a movie itself on the user's portable device that is near the IFS 402.

Figure 5:
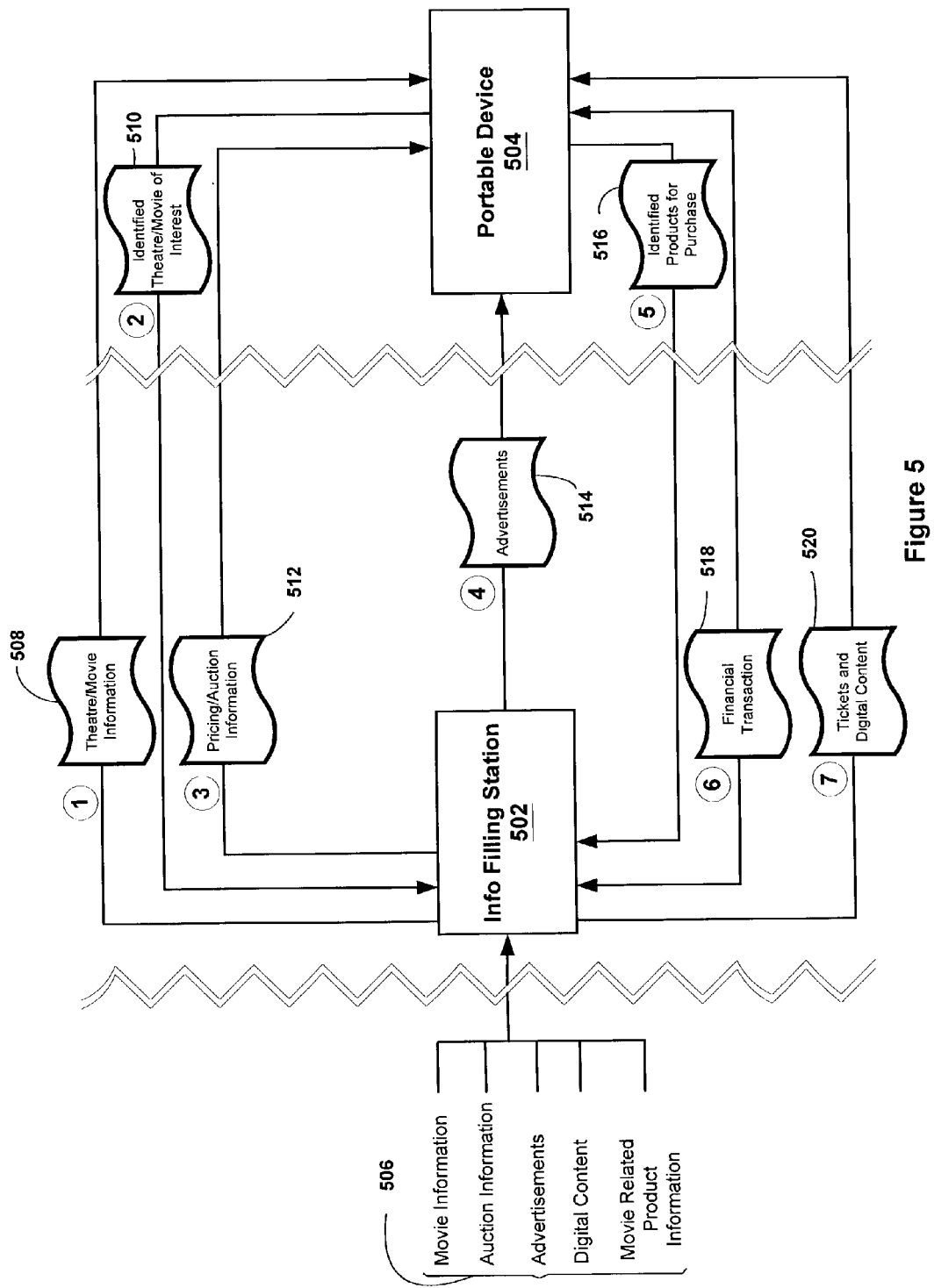
FIG. 5 illustrates system interaction in the preferred embodiment between the IFS and the portable device.

FIG. 5 illustrates system interaction in the preferred embodiment between an IFS 502 and a portable device 504. One or more content providers forward data content 506 such as movie information, auction information, advertisements, movie related products information, and digital content to information filling station 502. The IFS 502 is accessed by the portable device 504, which requests and receives theater/movie information 508. Next, users of the portable device identify a theater and a movie of interest 510 in the theater based upon the received theater/movie information. Upon receiving such identification for a theater and movie of interest, the IFS 502 forwards pricing and auction information related to that theater and movie of interest. Additionally, advertisements 514 can be pushed to the portable device 504 promoting the sales of movie related products or digital content related to the movie of interest. The portable device 504 then sends a request for the purchase of any identified tickets, movie related products, or digital movie content 516 and, upon successful completion of a financial transaction 518 related to such a purchase, the IFS forwards a confirmation related to the purchase of tickets or products and forwards any purchased digital content 520 to the portable device 504 (or, optionally, sends the digital content to a physical address in a storage medium).

It should be noted that, for illustration purposes, the wireless network (such as a wireless network based on the 802.11b communication protocol) between the IFS 502 and the portable device 504 is omitted in FIG. 5.

Figure 6:
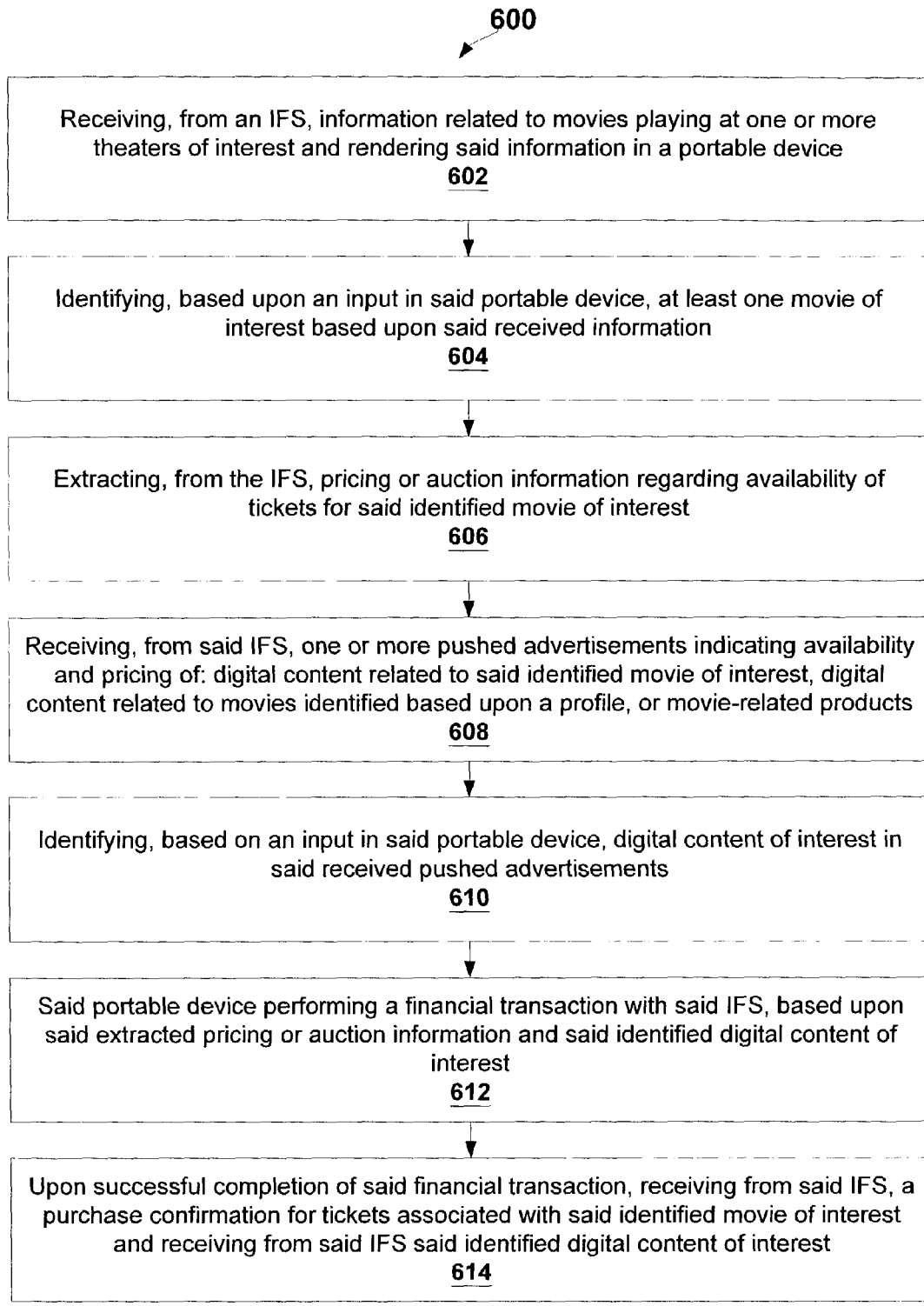
FIG. 6 illustrates a method of the present invention as implemented between an IFS and a portable device.

FIG. 6 illustrates a method 600 of the present invention as implemented between an IFS and a portable device. In step 602, a portable device associated with a user receives (based upon an earlier request) information related to movies playing at one or more theaters of interest (e.g., information such as trailers, reviews, showtimes, ticket availability, prices, and/or supplemental information), wherein the received information is rendered in the portable device. Next, in step 604, based upon an input in the portable device, at least one theater of interest and at least one movie of interest in the theater of interest is identified and communicated to the IFS. In step 606, the portable device receives pricing and auction information regarding the availability of tickets for the identified movies(s) of interest from the IFS. Additionally, in step 608, the portable device also receives and renders one or more advertisements indicating availability and pricing of: digital content related to the identified movie(s) of interest, digital content related to one or more movies identified based upon a profile of the user of the portable device, or movie related products.

Next, in step 610, the user of the portable device identifies, from the advertisements and based upon an input in the portable device, digital content or products of interest. In step 612, the portable device performs a financial transaction with the IFS, wherein the transaction is based upon the received pricing and auction information and the identified digital content of interest. Such financial transactions are accomplished either of two ways. First, the user can have a pre-established personal profile containing credit card information which the user utilizes to execute a financial transaction (via the IFS) without delivering their credit card number over the IFS network. Alternatively, the user can input the their credit or debit card information in the portable device which in turn delivers this information via a secure link to the provider or digital content services. Upon successful completion of the financial transaction, the portable device receives a purchase confirmation and any identified digital content of interest in step 614. It should be noted that any purchased digital content can also be optionally sent to a physical address instead of being transferred to the portable device.

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code based products are software modules for: aiding in the transmission, based upon a wireless protocol, of requested information related to events playing at one or more venues of interest (e.g., the venue could be a theater, the event could be a movie, and the information could be trailers, reviews, showtimes, ticket availability, prices, supplemental information); receiving at least one identified venue of interest and at least one identified event of interest in the venue of interest; aiding in the transmission of pricing and auction information regarding the availability of tickets for the identified event(s) of interest; aiding in the transmission of one or more advertisements indicating availability and pricing of: digital content related to the identified event of interest, digital content related to an event identified based upon a profile of the user of the portable device, or event related products; receiving an identification indicating digital content or products of interest and tickets of interest; facilitating a financial transaction based upon the identified tickets of interest and the identified digital content of interest; and aiding in the transmission of a purchase confirmation upon successful completion of the financial transaction and aiding in sending the identified digital content of interest either electronically or to a physical address.

CONCLUSION

The above embodiments provide for the effective implementation of a system and method for wirelessly transmitting requested information and digital data content related to events from an information filling station to a portable computer-based device. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, format of digital content, type of wireless communication, type of portable computer based device, mode of transfer of digital content, location of information station, type of venue, or type of event.

The above enhancements are implemented in various computing environments. For example, the present invention may be implemented on a conventional IBM PC or equivalent, multi-nodal system (e.g., LAN) or networking system (e.g. Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of wireless transmission protocol programming (e.g., 802.11b communication protocol programming) and database management.

The invention claimed is:

1. A business method for wirelessly transmitting requested information and digital data content related to one or more events from an information filling station (IFS) to a portable computer-based device, said transmission based upon a wireless protocol, said business method as implemented in said IFS comprising the steps of:
   a. receiving a request, from said portable device, for information related to one or more events scheduled at one or more venues of interest;
   b. transmitting said requested information to said portable device;
   c. receiving, from said portable device, at least one identified venue of interest and at least one identified event of interest in said identified venue of interest;
   d. transmitting, to said portable device, available pricing and auction information regarding the availability of tickets for said identified event of interest;
   e. transmitting, to said portable device, one or more advertisements indicating availability and pricing of: digital content related to said identified event of interest, digital content related to one or more additional events identified based upon a profile of the user of said portable device, and event related products;
   f. receiving, from said portable device, an identification indicating digital content of interest, event related products of interest, and tickets of interest;
   g. facilitating a financial transaction based upon said received identification in step f;
   h. upon successful completion of said financial transaction, transmitting, to said portable device, a purchase confirmation with instructions for collecting said tickets of interest; and
   i. delivering said identified digital content of interest and said event related products of interest.

2. A business method as per claim 1, wherein said IFS receives said digital content from one or more content providers, said content providers communicating with said IFS via a network that is any of the following: a local area network (LAN), a wide area network (WAN), a wireless network, a telephony-based network, or the Internet.

3. A business method as per claim 1, wherein said wireless protocol is based upon the IEEE 802.11b standard.

4. A business method as per claim 1, wherein said portable device is any of the following: a laptop, a pen-based computer, a PDA, a wireless phone with a display, or a pager with a display.

5. A business method as per claim 1, wherein said IFS is located at a remote location from said identified venue of interest.

6. A business method as per claim 1, wherein said identified digital content of interest and/or said event related product of interest are delivered on a storage medium to a physical address.

7. A business method as per claim 1, wherein said identified digital content of interest is wirelessly delivered to said portable device.

8. A business method as per claim 1, wherein said information related to one or more events is any of, or a combination of, the following: previews, reviews, showtimes, direct ticket availability, auction-based ticket availability, prices, food availability/price, comments by event creators/producers/directors, or text of dialogue related to said events.

9. A business method as per claim 8, wherein said reviews are any of, or a combination of, the following: text reviews, audio reviews, or video reviews.

10. A business method as per claim 8, wherein said business method further comprises the steps of:
   a. placing a food order for pick-up or delivery at said identified venue of interest; and
   b. including a cost associated with said food order in said financial transaction.

11. A business method as per claim 1, wherein said digital content related to said event of interest is any of the following: copy of said event of interest or copy of a soundtrack of said event of interest.

12. A business method as per claim 1, wherein said method further comprises the step of receiving feedback related to said event of interest or digital content of interest.

13. An article of manufacture comprising a computer usable medium having computer readable program code embodied therein aiding in a wireless interaction between an information filling station (IFS) and a portable device, said interaction facilitating transfer of requested information and digital data content related to one or more events, said medium further comprising:
   a. computer readable program code receiving a request, from said portable device, for information related to one or more events scheduled at one or more venues of interest;
   b. computer readable program code extracting said requested information and aiding in the transmission of said requested information to said portable device;

c. computer readable program code receiving, from said portable device, at least one identified venue of interest and at least one identified event of interest in said identified venue of interest;

d. computer readable program code extracting available pricing and auction information regarding the availability of tickets for said identified event of interest and aiding in the transmission of said extracted pricing and auction information;

e. computer readable program code identifying and aiding in transmission, to said portable device, of one or more advertisements indicating availability and pricing of: digital content related to said identified event of interest, digital content related to one or more additional events identified based upon a profile of the user of said portable device, and event related products;

f. computer readable program code receiving, from said portable device, an identification indicating digital content of interest, event related products of interest, and tickets of interest;

g. computer readable program code facilitating a financial transaction based upon said received identification in step f;

h. upon successful completion of said financial transaction, computer readable program code aiding in the transmission, to said portable device, of a purchase confirmation with instructions for collecting said tickets of interest; and i. said computer readable program code facilitating the delivery of said identified digital content of interest and said event related products of interest.

14. An article of manufacture as per claim 13, wherein said wireless interaction is based upon the IEEE 802.11b standard.

15. A method for wirelessly transmitting requested information and digital data content related to movies from an information filling station (IFS) to a portable computer-based device, said transmission based upon a wireless protocol, said method as implemented in said IFS comprising the steps of:

a. receiving a request, from said portable device, for information related to movies playing at one or more theaters of interest;

b. transmitting said requested information to said portable device;

c. receiving, from said portable device, at least one identified theater of interest and at least one identified movie of interest in said theater of interest;

d. transmitting, to said portable device, available pricing and auction information regarding the availability of tickets for said identified movie of interest;

e. transmitting, to said portable device, one or more advertisements indicating availability and pricing of: digital content related to said identified movie of interest, digital content related to one or more movies identified based upon a profile of the user of said portable device, and movie related products;

f. receiving, from said portable device, an identification indicating digital content of interest, movie related products of interest, and tickets of interest;

g. facilitating a financial transaction based upon said received identification in step f;

h. upon successful completion of said financial transaction, transmitting, to said portable device, a purchase confirmation with instructions for collecting said tickets of interest; and i. delivering said identified digital content of interest and said movie related products of interest.

16. A method as per claim 15, wherein said IFS receives said digital data content from one or more content providers, said content providers communicating with said IFS via a network that is any of the following: a local area network (LAN), a wide area network (WAN), a wireless network, a telephony-based network, or the Internet.

17. A method as per claim 15, wherein said wireless protocol is based upon the IEEE 802.11b standard.

18. A method as per claim 15, wherein said portable device is any of the following: a laptop, a pen-based computer, a PDA, a wireless phone with a display, or a pager with a display.

19. A method as per claim 15, wherein said IFS is located at a remote location from said identified venue of interest.

20. A method as per claim 15, wherein said identified digital content of interest and/or said movie related products of interest are delivered on a storage medium to a physical address.

21. A method as per claim 15, wherein said identified digital content of interest is wirelessly delivered to said portable device.

22. A method as per claim 15, wherein said information related to one or more movies is any of, or a combination of, the following: movie previews, movie reviews, movie showtimes, direct ticket availability, auction-based ticket availability, movie ticket prices, food availability/prices, comments by movie creators/producers/directors, or text of dialogue related to said movies.

23. A method as per claim 22 wherein said method further comprises the steps of:

a. placing a food order for pick-up or delivery at said identified theater of interest; and b. including a cost associated with said food/snack order in said financial transaction.

24. A method as per claim 15, wherein said digital content related to said movies of interest is any of the following: copy of said movie of interest or copy of a soundtrack of said movie of interest.

25. A method as per claim 15, wherein said method further comprises the step of receiving feedback related to said movie of interest or digital content of interest.

26. A method for wirelessly receiving information and digital data content related to movies from an information filling station (IFS) onto a portable device, said method as implemented in the portable device comprising the steps of:

a. receiving from said IFS and based upon an request, information related to movies playing at one or more theaters of interest;

b. identifying, based upon said rendered information, at least one theater of interest and at least one movie of interest in said theater of interest;

c. transmitting, to said IFS, said identified information;

d. receiving, from said IFS, available pricing and auction information regarding the availability of tickets for the identified movie(s) of interest;

e. receiving, from said IFS, one or more advertisements indicating availability and pricing of: digital content related to the identified movie(s) of interest, digital content related to one or more movie identified based upon a profile of the user of the portable device, or one and more movie related products;

f. rendering said one or more advertisements;

g. identifying, based upon said rendered advertisements and based upon an input in the portable device, tickets of interest, digital content and/or movie related products of interest;

h. performing a financial transaction with said IFS, said transaction based upon said received pricing and auction information and said identified digital content of interest;

i. upon successful completion of said financial transaction, receiving from said IFS, a purchase confirmation with instructions for collecting said tickets of interest; and j. receiving any identified digital content of interest and/or movie related products of interest.

27. A method as per claim 26, wherein said wireless protocol is based upon the IEEE 802.11b standard.

28. A method as per claim 26, wherein said IFS is located at a remote location from said identified theatre of interest.

29. A method as per claim 26, wherein said identified digital content of interest and/or movie related products are delivered on a storage medium to a physical address.

30. A method as per claim 26, wherein said identified digital content of interest is wirelessly delivered to said portable device.

* * * * *